(12) United States Patent
Lynch et al.

(10) Patent No.: US 6,581,097 B1
(45) Date of Patent: Jun. 17, 2003

(54) METHOD AND SYSTEM OF DETERMINING A JOB TICKET FOR A PRINT STREAM DETERMINING PROCESS

(75) Inventors: John P. Lynch, Yorkville, IL (US); Robert P. Williamson, Naperville, IL (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/222,640

(22) Filed: Dec. 30, 1998

(51) Int. Cl.[7] ............................ G06F 17/40; G06F 15/16
(52) U.S. Cl. ........................ 709/226; 710/5; 358/1.15; 399/10; 399/77; 399/82
(58) Field of Search ................................. 709/217, 218, 709/219, 223, 226, 236; 710/5, 6, 7; 358/1.1, 1.15; 705/1, 5, 6, 400, 406; 707/500, 505; 399/1, 8, 9, 10, 75, 76, 77, 82

(56) References Cited

U.S. PATENT DOCUMENTS

| | | | |
|---|---|---|---|
| 4,970,554 A | * 11/1990 | Rourke | 355/77 |
| 5,270,775 A | 12/1993 | Suzuki et al. | 399/8 |
| 5,353,388 A | 10/1994 | Motoyama | 358/1.18 |
| 5,383,129 A | 1/1995 | Farrell | 705/400 |
| 5,384,620 A | * 1/1995 | Ebner et al. | 399/1 |
| 5,423,043 A | 6/1995 | Fitzpatrick et al. | 709/317 |
| 5,450,571 A | * 9/1995 | Rosekrans et al. | 345/866 |
| 5,467,434 A | * 11/1995 | Hower et al. | 358/1.13 |
| 5,475,801 A | 12/1995 | Brindle et al. | 358/1.15 |
| 5,483,653 A | * 1/1996 | Furman | 358/1.15 |
| 5,495,561 A | 2/1996 | Holt | 358/1.15 |
| 5,499,369 A | 3/1996 | Atkinson | 709/31.5 |
| 5,506,661 A | 4/1996 | Hanzawa | 399/1 |
| 5,528,734 A | 6/1996 | Sanchez | 358/1.16 |
| 5,566,278 A | 10/1996 | Patel et al. | 358/1.15 |
| 5,572,632 A | 11/1996 | Laumeyer et al. | 358/1.17 |
| 5,579,087 A | 11/1996 | Salgado | 399/1 |
| 5,619,649 A | * 4/1997 | Kovnat et al. | 358/1.1 |
| 5,644,682 A | 7/1997 | Weinberger et al. | 358/1.1 |
| 5,715,379 A | 2/1998 | Pavlovic et al. | 358/1.13 |
| 5,754,830 A | 5/1998 | Butts et al. | 709/311 |

(List continued on next page.)

OTHER PUBLICATIONS

"Copyright: The Java Tutorial" for the Internet, 1995 Sun Microsystems.
"Object–Oriented Modeling and Design", Prentice Hall, Englewood Cliffs, New Jersey.

*Primary Examiner*—Dung C. Dinh
(74) *Attorney, Agent, or Firm*—Ronald Reichman; Paul A. Levitsky; Angelo N. Chaclas

(57) ABSTRACT

The invention is a method of establishing, and a structure for, a print stream job ticket. The method begins with receiving a unique job message identifier from a server client, where the identifier is representative of a particular print processing job. Once the identifier is received, the method locates a job ticket template database then attempts to match the received identifier with a template located in the database. The matching step is accomplished by plotting each element of the identifier to determine a set of elements to be mapped against a corresponding template. The identifier is then mapped against each one of the templates to determine a match based upon a set of matching rules. If a match exists, the matched template is selected to establish a new job ticket. If no match exists, then the next closest match between the identifier and any one of the templates is determined to establish a match; and, then the method creates a new job ticket template, and endows it with a set of print job parameters. The job ticket structure itself is representative of a print stream job to be performed by the client server. The structure comprises a unique ticket identifier representative of the job ticket. It further comprises a set of jobs, each job further comprising job properties that define one or more attributes of a particular job. The job ticket additionally comprises a set of links to activate one or more peripheral devices for producing the print stream job.

11 Claims, 5 Drawing Sheets

U.S. PATENT DOCUMENTS

| | | | | |
|---|---|---|---|---|
| 5,760,775 A | * | 6/1998 | Sklut et al. | 345/772 |
| 5,790,119 A | | 8/1998 | Sklut et al. | 345/839 |
| 5,828,855 A | | 10/1998 | Walker | 710/305 |
| 5,974,443 A | | 10/1999 | Jeske | 709/202 |
| 5,978,560 A | | 11/1999 | Tan et al. | 358/1.15 |
| 6,031,623 A | | 2/2000 | Smith et al. | 358/1.14 |
| 6,173,295 B1 | * | 1/2001 | Goertz et al. | 707/505 |
| RE37,258 E | | 7/2001 | Patel et al. | 700/2 |
| 6,370,521 B1 | | 4/2002 | Pigos, Jr. et al. | 707/2 |

* cited by examiner

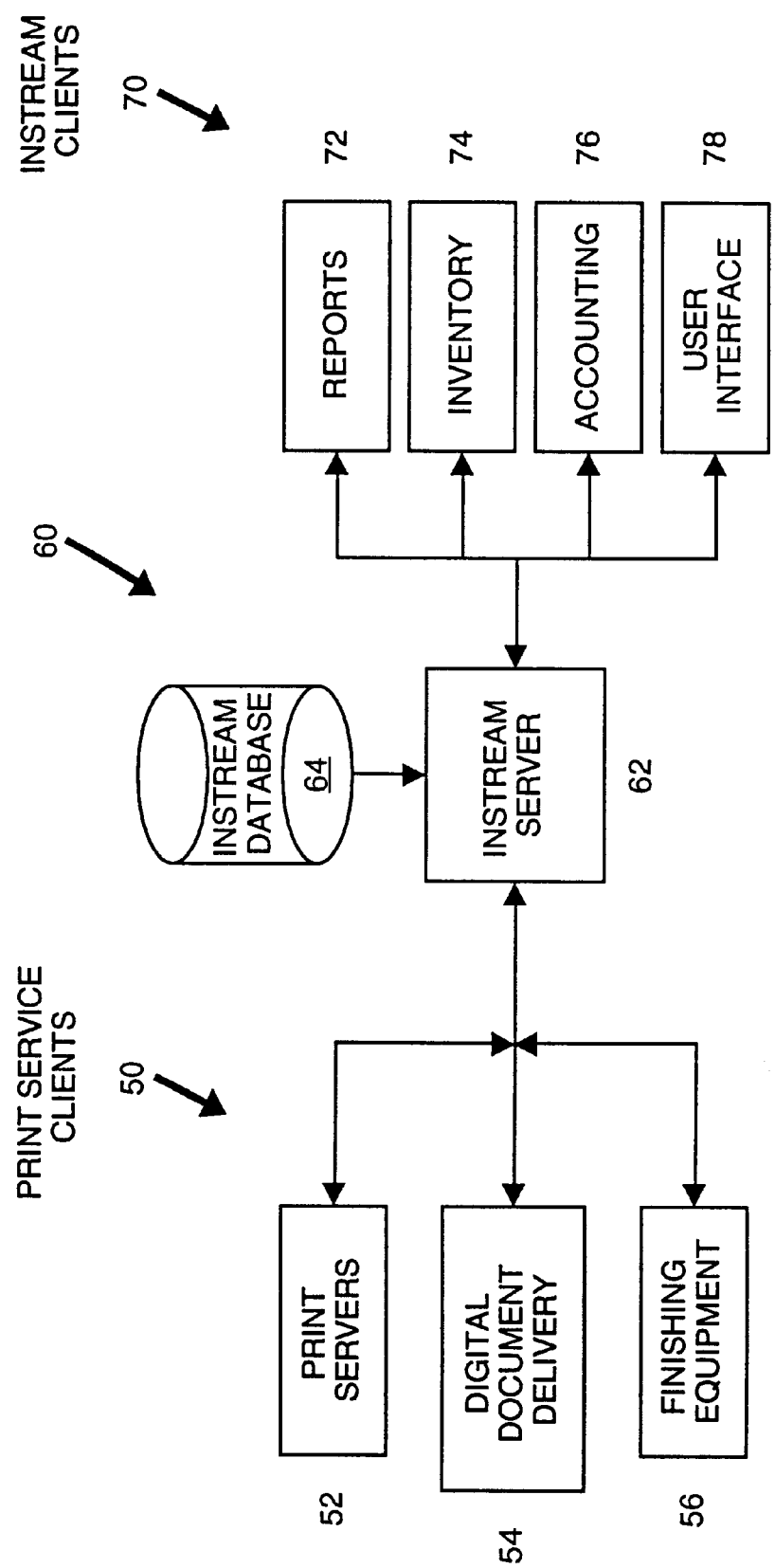

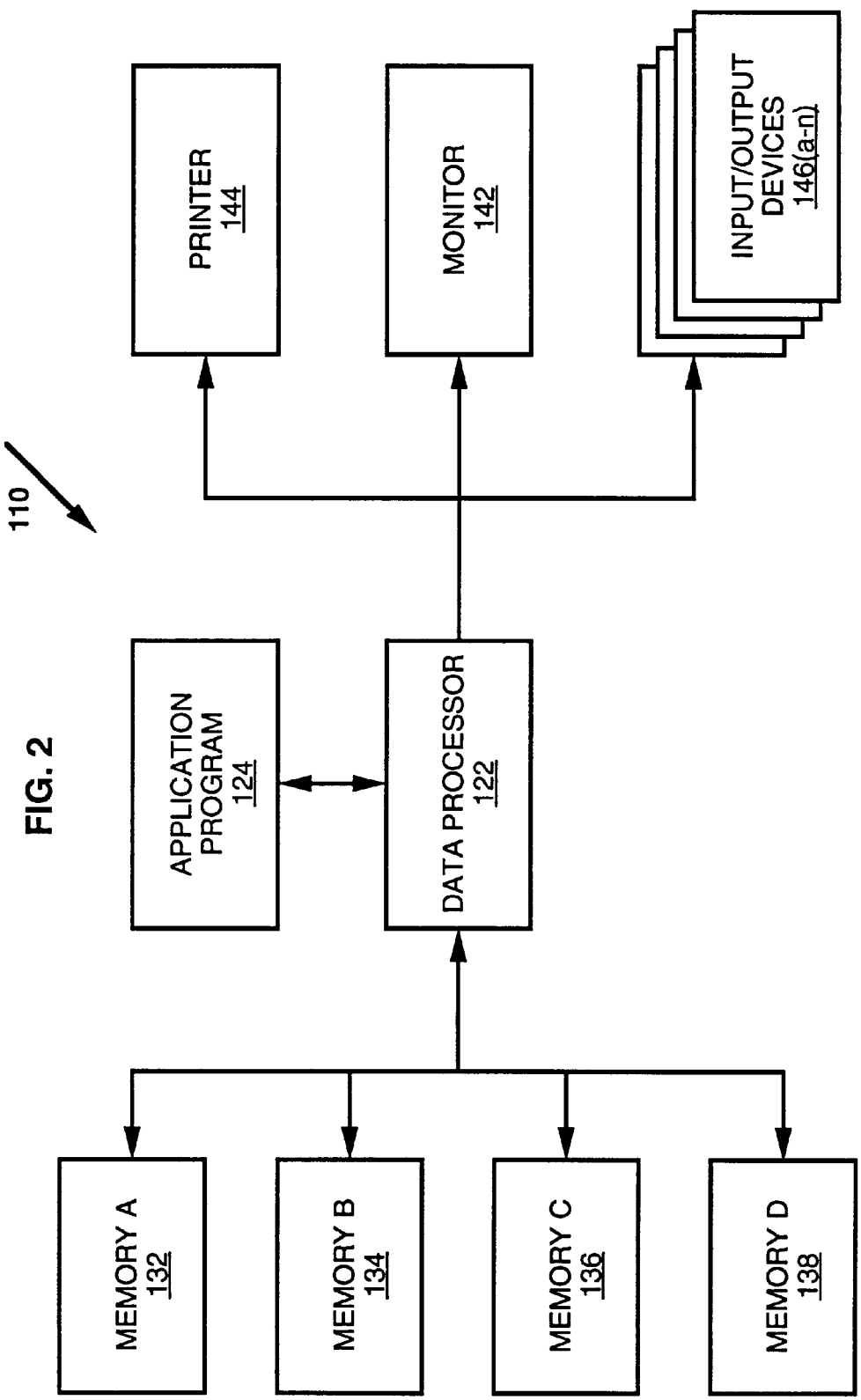

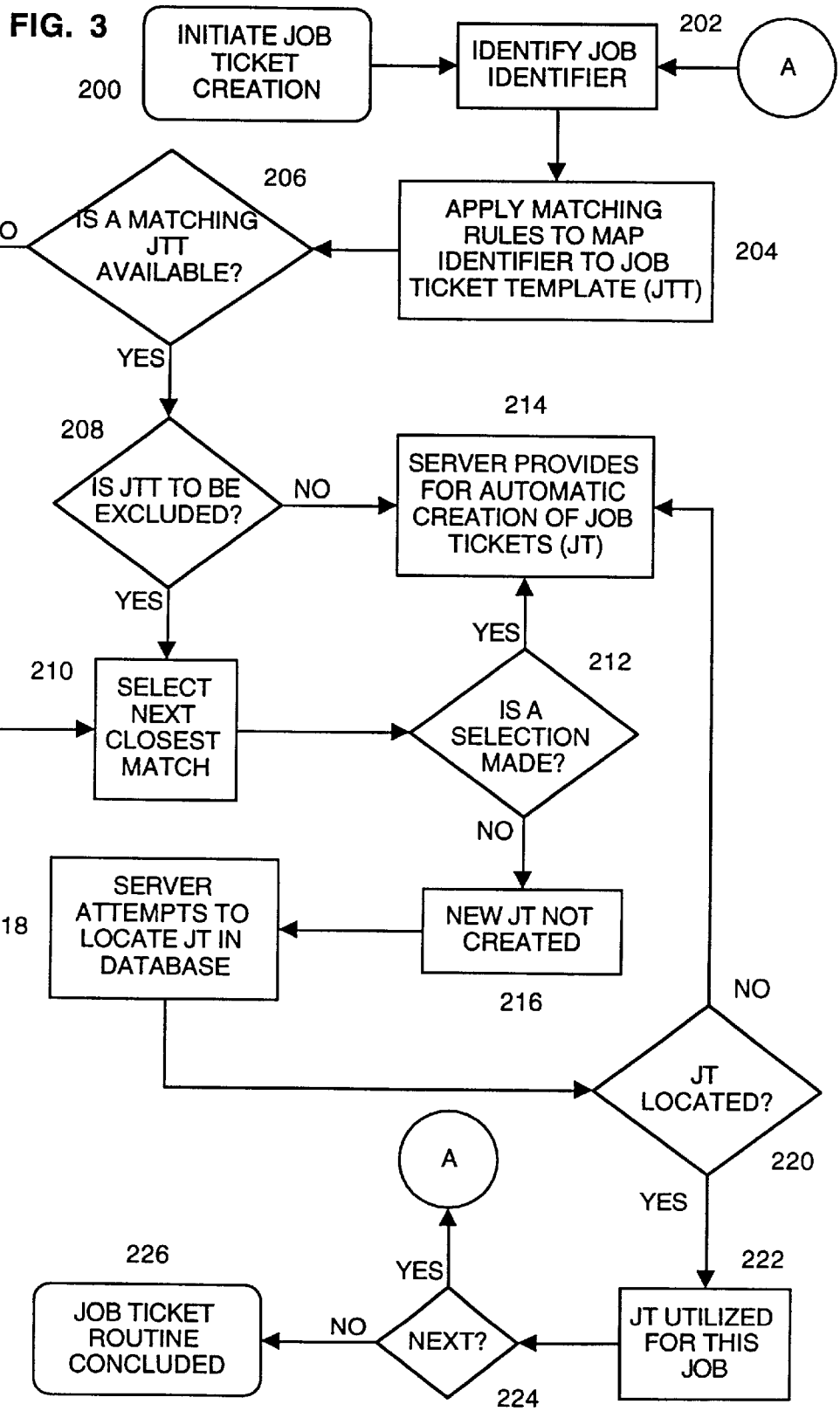

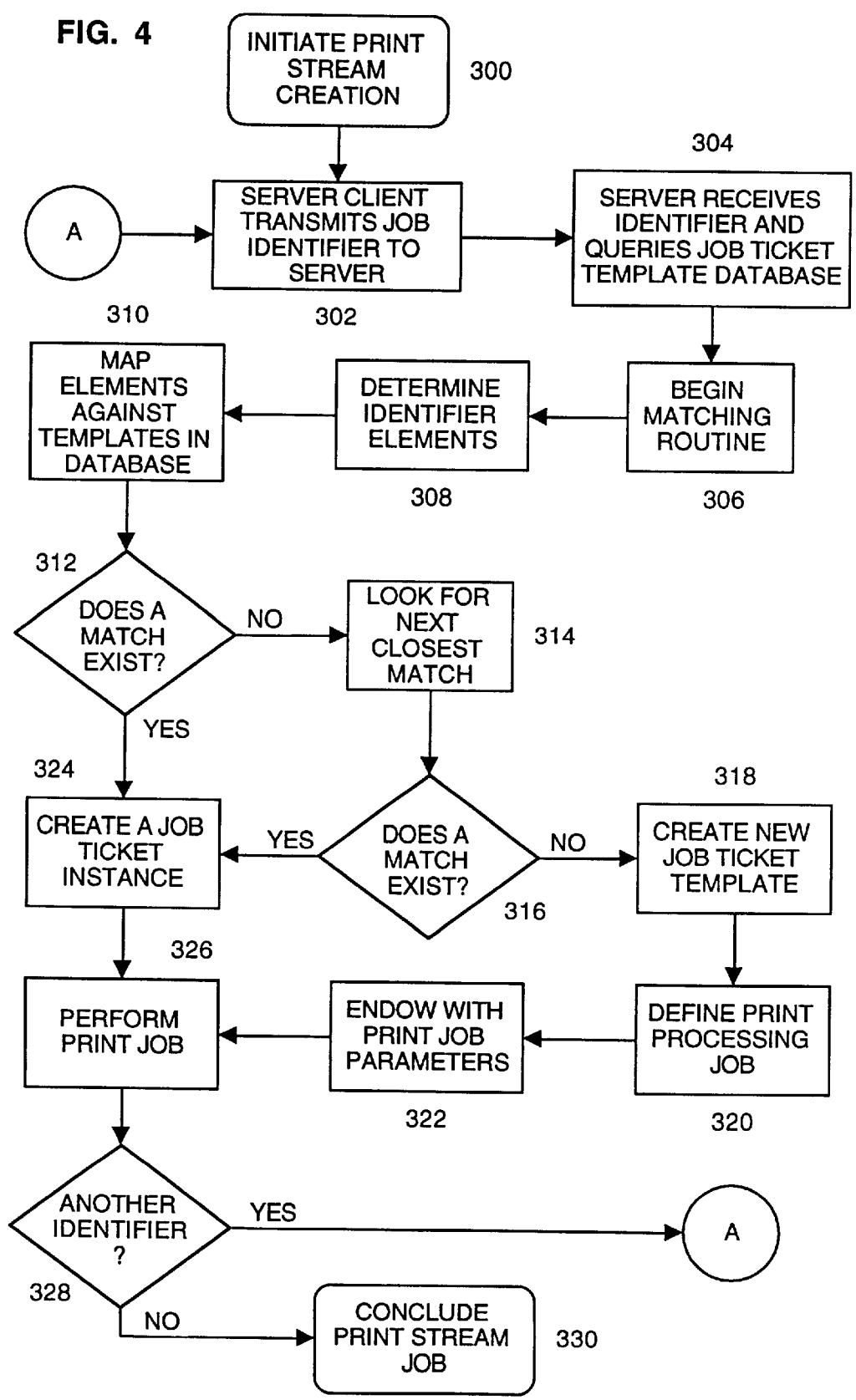

METHOD AND SYSTEM OF DETERMINING A JOB TICKET FOR A PRINT STREAM DETERMINING PROCESS

RELATED APPLICATIONS

Reference is made to application Ser. No. 09/222,745, entitled A METHOD AND SYSTEM FOR PRINT STREAM JOB DETERMINATION AND ANALYSIS, assigned to the assignee of this application and filed on even date herewith.

Reference is made to application Ser. No. 09/223,348, entitled MESSAGE STRUCTURE FOR A PRINT STREAM DETERMINING AND ANALYSIS SYSTEM, assigned to the assignee of this application and filed on even date herewith.

Reference is made to application Ser. No. 09/223,304, entitled A METHOD OF ESTABLISHING A SET OF PRINT STREAM OBJECTS IN AN OBJECT ORIENTED ENVIRONMENT, assigned to the assignee of this application and filed on even date herewith.

FIELD OF THE INVENTION

The general field of the invention is that of data processing, and, more specifically, print stream processing. In its most specific segmentation, the field is that of optimization of those devices directed to processing a print stream for the purpose of producing a plurality of mailpieces.

BACKGROUND OF THE INVENTION

In the past several years, significant changes have occurred in the operation of high volume document production centers. These centers have merged traditional printing capabilities with mailroom production facilities. Executives tasked with the management of both print and mail operations are expected to play an ever-growing role in the creation and design of document centers that will deliver effective, high quality, and high integrity output. The current development and emphasis on these centers in corporations or regional centers has lead to the growing use of the term "Automated Document Factory" (hereinafter "ADF") to describe consolidated printing and mail finishing operations.

In current practice, large mailing companies tend to separate the process of creating documents from the process of manufacturing documents (mailpieces). The print center tasked with finishing the created document receives both scheduled and scheduled print jobs with a wide range of requirements. These print jobs are evaluated, scheduled, and executed in the print/finish center.

Because the print/finish center has traditionally been "information systems poor," most of the work required to prepare or "condition" the print job for manufacturing was created in the business unit or print service client. Typical conditioning processes include: performing postal address hygiene; adding PostNet™ barcodes; presorting mailings; adding inserter barcode instructions; adjusting printer paper size and orientation; and, adding spot color instructions.

The manager of such a print/finish operation, seeking to maximize efficiency through optimal use of equipment and decision making tools, is faced with a dilemma. First, the decisions about the structure and management of the print/finish center are generally made outside of the center; the decisions are generally made by the Information Systems (IS) group creating the print job and its associated print stream. Document manufacturing requests are also assigned lower priorities, further limiting management control. Second, the hardware systems and their associated peripheral devices are often sourced from different manufacturers so that the printers and inserters being fed by the print stream are relying on differing motivators from the print stream.

To help classify and organize the concept of the emerging print/finish center, an architecture has been developed within the print stream industry that is referred to as the ADF. The Automated Document Factory™ architecture proposed by the Gartner Group of Stamford, Conn., provides a model for a set of processes that prepares and positions enterprises to manage the creation and delivery of high-volume digitized documents by using factory production techniques that appropriately and optimally mechanize document production. The raw materials of production (i.e., the document data and preparation instructions), enter the ADF which transforms them into digital documents and prepares them for delivery.

The architecture for the ADF is comprised of four (4) modules; these include: input; transformation; delivery and preparation; and, control and reporting. Each module, or building block, is made up of other modules and each is connected by a series of interfaces, or links.

Each of the building blocks must be linked through effective communication which includes the tracking and measurement of the input and output of the document manufacturing hardware and associated peripherals. To enhance productivity and cost-effectiveness of the overall system, systems managers need to be able to scrutinize every element of the print job process to see where improvements can be made. Thus, each of the modules takes on an increased significance when viewed with respect to their relationship with the overall system.

There is thus a need to provide each of the modules for the ADF so that the structure can be self supporting and viable. The input module is where all of the data and instructions needed to transform the arriving print stream data into documents enters the ADF. The present invention is currently being introduced to the print stream market by the assignee of the present invention, Pitney Bowes Inc. of Stamford, Conn., as the InStream™ server which is designed as the input module for the ADF.

It is an object of the present invention to provide a significant sub-module that supports the input module of the conceptual ADF frame by describing herein the establishment and use of a job ticket. The job ticket drives the manufacturing process by providing the parameters for the job to be performed.

It is a further object of the present invention to provide a method of optimizing the use of time and hardware performance in manufacturing documents that have been digitally delivered through the input module.

SUMMARY OF THE INVENTION

The invention is a method of establishing a job ticket representative of a print stream job, and the structure of the job ticket, to be performed by a client server.

The method begins with the step of receiving a unique job message identifier from a server client, wherein the unique job message identifier is representative of a particular print processing job. The print processing job, in turn, further comprises: a printer selection routine; and/or, an inserter instruction set; and/or, a communication instruction set. Once the unique job message identifier is received, then the method locates a job ticket template database representative of a set of unique job message identifiers.

The method then attempts to match the received unique job message identifier with a job ticket template located in the job ticket template database. The matching step is accomplished by plotting each element of the unique message identifier to identify a set of elements to be mapped against a corresponding job ticket template. The database comprising a set of one or more job ticket templates is selected, and the unique message identifier is mapped against each one of the one or more job ticket templates. The initial job ticket template is created by a system operator to form a model for subsequent job tickets created during the ticket matching step and wherein the template is copied during the ticket matching step to create a new job ticket instance. It is then determined whether or not a first match exists between the unique message identifier and any one of the one or more job ticket templates. If a match exists, then the matched template is selected to establish a new job ticket. However, if no match exists, then the next closest match between the unique message identifier and the any one of the one or more job ticket templates is determined to establish a second match. The match determination is based upon a set of one or more matching rules. It is important to note that the rules may comprise an exclusion wherein the message identifier is identified as being excluded from being matched against the one or more templates.

If it is determined that a match exists between the received unique job message identifier and the job ticket template; then the method produces a job ticket instance. And, if the match is not found to exist, then creating a new job ticket template, and endowing the new job ticket template with a set of print job parameters representative of the print stream job.

If a match is not determined, however, then the method logs a system event. The system event initiates the creation of a new set of job parameters wherein the parameters establish a job ticket representative of the parameters, and wherein further, the job ticket establishes a job ticket template which is stored in the database of the client server.

The job ticket structure itself is representative of a print stream job to be performed by the client server. The structure comprises a unique ticket identifier representative of the job ticket. It further comprises a set of one or more jobs, each one of the one or more jobs further comprising job properties that define one or more attributes of a particular job. The attributes, in turn, comprise a name, a value, and a type.

The job ticket additionally comprises a first set of one or more links to a first set of one or more objects corresponding to each one of the first set of links and wherein the first set of objects activate a set of one or more peripheral devices for producing the print stream job. The first set of one or more objects may contain a printer selection routine, an inserter instruction set, and/or, a communication instruction set. The job ticket further provides a second set of one or more links to a second set of one or more objects corresponding to each one of the second set of links wherein the second set of objects activate a set of one or more routines for establishing statistics and/or reporting representative of the print stream job.

BRIEF DESCRIPTION OF THE DRAWINGS

FIG. 1B is a block diagram of the system of the present invention and is shown as three (3) subsystems.

FIG. 2 is a block diagram of a data processing system which is representative of a system which could act as host to the invention's method.

FIG. 3 is an upper level flowchart of the method of assembling a job ticket which can be performed by the print stream processing application.

FIG. 4 is a detailed flowchart of the method of assembling a job ticket by matching a unique job message identifier with templates in a job ticket template database.

DETAILED DESCRIPTION OF THE PREFERRED EMBODIMENTS

Figure 1A:
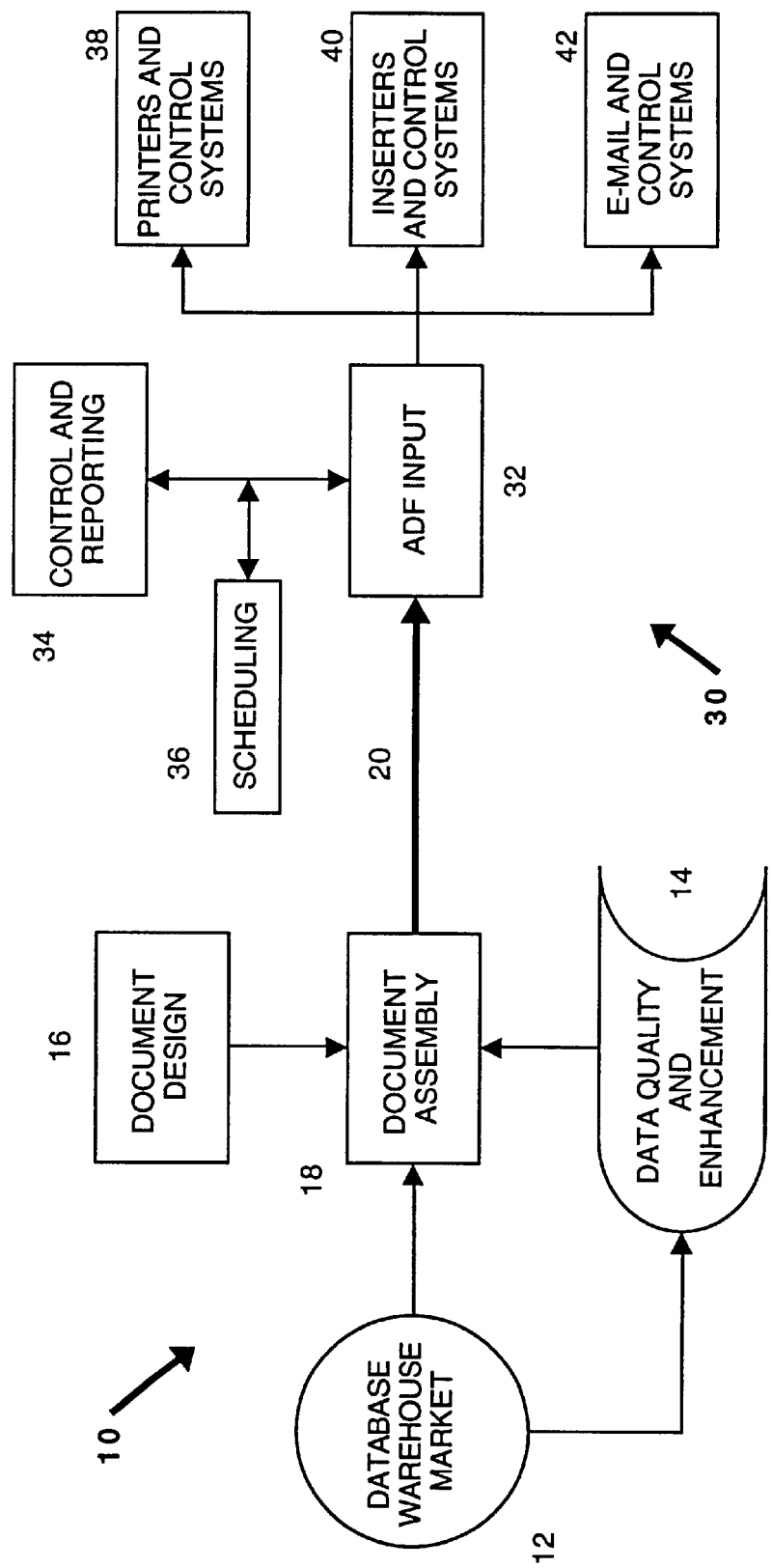
FIG. 1A is an upper level block diagram of a host system which is capable of supporting the method of the present invention.

FIG. 1A is an upper level block diagram of a host system which is capable of providing input to, and supporting, the method of the present invention while further providing output paths.

The system is divided into two subsystems; these are designated as document creation 10 and document manufacturer 30 which will also be referred to as the Automated Document Factory or ADF.

Document creation 10 includes a database warehouse market 12 which provides one or more data streams to be incorporated within the document assembly at document assembly station 18. The data streams are sourced from one or more databases contained within the database warehouse market 12 at the request of a document assembly routine within document assembly 18. The data may pass directly to document assembly 18 or may first pass through data quality and enhancement routine 14. Data quality and enhancement routine 14 processes data so as to prepare it for the requirements of the document assembly routine. If the document assembly routine does not require quality or enhancement processing, then the data would pass directly from the database warehouse market 12 to document assembly 18.

Document assembly 18 prepares a digital document and transmits the document to an ADF via a digital document transmission 20 known as a print stream. The ADF subsystem is shown in FIG. 1A as document manufacturer 30.

Document manufacturer 30 receives the digital document transmission 20 at the ADF input 32 and assigns a job ticket to the stream which is indicative of the print parameters associated with the print stream. ADF input 32 will re-direct the stream in accordance with the job ticket to various peripheral devices for printing and/or various output paths for re-transmission or data storage. The peripheral devices and output paths include: printers and their associated control systems 38; inserters and their associated control systems 40; and, E-mail and transmission control systems 42. It should be noted that the current invention is not limited to the embodiment shown, but may include any print stream finishing device such as console print stream finishers, storage devices for re-transmission, or interim data quality and enhancement routines for processing the print stream.

As ADF input 32 processes and directs the print stream, it will constantly monitor the forces acting on the print stream through control and reporting routines 34; these routines will in turn interface with scheduling module 36 to promote efficiency in current or subsequent print stream processing.

Turning to FIG. 1B there is shown a block diagram of the system of the present invention which is further broken down into three (3) subsystems designated as print service clients 50, InStream server system 60, and InStream clients 70.

Print service clients 50 is comprised of: print servers 52 which are receiving one or more print streams from InStream server 62 and reporting back statistical or process data which can be used by InStream clients 70 to manage the document creation process; digital document delivery systems 54 which enable high-volume mail producers to utilize existing legacy-generated print streams, and the images they contain, to further access internet billing and bill presentment applications; and, finishing equipment 56 for actually producing the document defined by the print stream.

Print service clients 50 communicate with InStream server system 60 via TCP/IP sockets. TCP/IP sockets are known to those skilled in the art and do not require further detail or explanation to fully appreciate and understand the present invention.

InStream server system 60 comprises InStream server 62 and InStream database 64. In one embodiment of the present invention, InStream server 62 is a multi-threaded, concurrent server running on the Win32™ platform (available from Microsoft Corporation of Redmond, Wash.). InStream server 62 is implemented in the Java™ programming language (available from Sun Microsystems, Inc. of Palo Alto, Calif.) and is therefore not necessarily restricted to the Win32 platform. Database access is provided via the Microsoft SQL™ server.

InStream clients 70 further comprises: reports 72 for producing print stream and finishing reports that can be used to monitor the system, determine optimal peripheral and system efficiencies or detail production; inventory 74 for monitoring system-wide capacity; accounting 76 for monitoring time and expense for sub-routines or document production activities; and, user interface 78 for monitoring of client activities.

Now turning to FIG. 2 there is shown a block diagram of a data processing system which is representative of a system which could act as host to the invention's method.

The ADF server is represented by data processing system 110 which is based on data processor 122. Data processor 122 is a central processing unit (CPU) of a computer (such as a personal computer (PC), a mid-frame (IBM AS/400), or main frame) and its associated RAM or other memory, operating system software, and application systems which are capable of performing basic print stream processing functions (such as SmartMailer® which is available from Pitney Bowes Inc. of Stamford, Conn.) or more advanced print stream processing (such as StreamWeaver® which is available from Pitney Bowes Inc. of Stamford, Conn.). The base components of the data processor 122 are known in the art and do not require a detailed description herein for an understanding of their utility and application.

Interoperatively connected to data processor 122 is the application program 124 which is the basis for the present application. Additionally, connected to data processor 122 are memory cells 132, 134, 136, and 138 which are utilized for saving various data streams being processed by the application program 124. The multiple memory means of the system may be located independently of each other, or may exist in co-located combinations. Varied memory means are contemplated wherein the memory may exist in the form of a PROM chip, PROM card, magnetic media, or other commercially available forms. The system layout, with respect to the memory, is at the convenience of the system designer. Further coupled to data processor 122, is printer 144 for document or print stream data output, monitor 142 which allows a system operator to view transactions occurring within the application program 24, and various input/output devices 146(*a–n*). Input and output devices 146(*a–n*), such as a keyboard for data input, or a modem for data transmission or reception can be interoperatively connected or interfaced to data processor 122 as appropriate.

Turning to FIG. 3, there is shown an upper level flowchart of the method of assembling a job ticket which can be performed by the print stream processing application. The InStream job ticket is a collection of parameters, attributes and processes required for the successful production of a document such as a mailpiece. Job tickets, initially are created manually by the systems operator and are specific to individual jobs or job groups. A job group is a collection of jobs with matching attributes. For example, a group of marketing jobs that all print on the same type of printer require the same type of form and must be finished on the same type of inserter can be grouped together to form a job group. A more detailed description of the job ticket and its creation is detailed in the co-pending application referenced hereinabove.

Job ticket creation is initiated at step 200 before advancing to step 202 where the job identifier is identified from the print stream data. Each message accompanying the print stream that an InStream client sends to the server contains a unique job identifier. Upon identifying the job identifier, the method advances to step 204 where the server applies matching rules to map the identifier to a job ticket template (JTT). Matching rules are established in the InStream database. Once the matching rules are applied, the method advances to a query at step 206.

Step 206 queries as to whether or not a matching JTT is available for the job identifier. If the response to the query is "NO," then the method advances to step 210 where the next closest match is determined as based upon the matching rules; otherwise, if the response is "YES," then the method advances to a query at step 208. The query at step 208 queries as to whether or not the JTT is to be excluded. The method allows for the exclusion of jobs from InStream server processing; thus, if the matching rules for a message identifier or range of identifiers indicate exclusion, then any associated JTTs are not run.

If the response to the query at step 208 is "YES," then the method advances to step 210 where the next closest match is determined as based upon the matching rules. From step 210, the method advances to a query at step 212 which asks if a template selection has been made. If the response is "YES," then the method advances to step 214 where the InStream server provides for the automatic creation of a new job ticket (JT). If the response to the query at step 208 is "NO," however, then the method advances directly to step 214.

Returning to the query at step 212, if the response to the query is "NO," then at step 216 a decision is made that a new job ticket will not created. From step 216, the method advances to step 218 where the InStream server attempts to locate an existing, matching job ticket in the database. The method then advances to step 220 where the method queries as to whether or not a job ticket was located in the database. If the response is "NO," then the method returns to step 214. However, if the response to the query at step 220 is "YES," then the InStream server will utilize, at step 222, the located, existing JT to run the current job.

When the JT has been utilized in step 222, the method will advance to step 224 and query as to whether or not there is a next job identifier to be identified. If the response to the query is "YES," then the method returns via path A to re-enter the method flow at step 202. If the response to the query at step 224 is "NO," however, then the method advances to step 226 and concludes the job ticket routine.

Turning to FIG. 4, there is shown a detailed flowchart of the method of assembling a job ticket by matching a unique job message identifier with templates in a job ticket template database.

There are a number of concepts which must be described before embarking on the discussion of FIG. 4. First, matching rules are established in the InStream database by which a message's unique identifier is mapped to exactly one job ticket template (JTT). A JTT is a template that the operator creates to form the basis for future job tickets. The template acts as a container for job templates. The job template contains default job properties which the operator defines. Additionally, the job template is copied when ticket matching occurs to create a new job instance. Job ticket template matching is the process by which job message identifiers are mapped with job ticket templates. A job ticket is an instance (a copy) of a job ticket template. After job ticket template matching occurs, a job ticket template is copied to create a new job ticket. The job ticket contains a collection of jobs. A job is an instance (a copy) of a job template. After job ticket template matching occurs, a job template is copied to create a new job. The job contains a collection of job properties that define attributes of the job. This collection is copied from the job template and is augmented by job message properties. A job message is sent from an InStream client to the InStream server; it may contain one or more job properties. A job property is an attribute of a particular job and contains a name, a value, and a job type.

The method flow begins with step 300 where the print stream creation is initiated. Each message that an InStream client sends to the server contains a unique job identifier. The method advances from step 300 to step 302 where the InStream server's client transmits the print job and its associated job message identifier to the server. The server receives, at step 304, the identifier and queries a selected job ticket template database so that a matching routine can be initiated at step 306. Upon reception of the message, the server attempts to locate a Job Ticket Template (JTT) which matches the unique job message identifier. The method then advances from step 306 to step 308 where the elements comprising the job message identifier are determined.

The determination of the job message identifier elements is important because it allows the InStream server to map, at step 310, the elements against the templates (JTTs) stored in the job ticket template database to determine a match. Each JTT has its own unique identifier as well. Additionally, the wildcard character "*" is utilized to allow a range of job identifiers to map to a JTT. The server attempts an exact match first; if no match occurs, the server looks recursively for the next closest match. If no match is found, a system event is logged. If the match is not exact (i.e., it matches to an "*"), a system event is logged to inform the system operator for future reference or reporting purposes.

The system allows for the exclusion of jobs from InStream processing. If the matching rules for a message identifier, or range of identifiers, indicate exclusion from the matching routine, then any associated JTTs are not run. If no matches are found for a message identifier, the default case of "*" is used; however, if the case were marked as "excluded," then a system event would be logged.

The following table shows some examples of how matching is employed by the server. The asterisk "*" is used as a wildcard character.

TABLE 1

| Unique Message Identifier | JTT Identifier |
|---|---|
| * | 100 |
| AR* | 120 |
| AR1024 | 130 |
| AR1025 | 140 |

TABLE 1-continued

| Unique Message Identifier | JTT Identifier |
|---|---|
| AR1026 | 150 |
| ABC* | 160 |

EXAMPLES (1) A message is received containing a unique job identifier consisting of "AR1025". An exact match is found. The server utilizes the JTT identified as "140" for all messages for that job identifier.

(2) A message is received containing a unique job identifier consisting of "AR3000". No exact match is found; therefore, continues searching and finds the next closest match to be "AR*". The server utilizes the JTT identified as "120" for all messages for that job identifier and logs an event to inform the user of an inexact match.

(3) A message is received containing a unique job identifier consisting of "BI1000". No match is found; therefore, the server reverts to the default case of "*". If no exclusion has been specified for the default case, then the server utilizes the JTT identified as "100" for all messages for that job identifier and logs an event to inform the user of the occurrence of an inexact match.

The method advances from step 310 to the query at step 312 where the method queries as to whether or not a match exists between the message identifier and any one of the templates in the database. If the response to the query at step 312 is "YES," then the method advances to step 324 where a job ticket instance is created by copying the matched template to form a new job ticket. The method advances from step 324 to step 326. However, if the response to the query at step 312 is "NO," then the method advances to step 314 where the next closest match is selected before advancing to the query at step 316.

At step 316, the method queries as to whether or not a match exists between the message identifier and any one of the templates in the database as determined by element weighting. If the response to the query at step 316 is "YES," then the method advances to step 324 where a job ticket instance is created by copying the matched template to form a new job ticket. The method advances from step 324 to step 326. However, if the response to the query at step 316 is "NO," then the method advances to step 318 where a new job ticket template is created.

The creation of a new job ticket template at step 318 causes the template to be generated, at step 320, in accordance with the defined print process job. The parameters of the job are evaluated at step 322 before becoming part of the new job ticket. The job parameters embedded in the job ticket assigned to the particular job at hand are then performed at step 326.

After performance of the print job, the method queries as to whether or not another identifier is to be delivered with the incoming print stream. If the response to the query is "YES," then the method returns via path A to re-enter the method flow at step 302; otherwise, the method advances to step 330 where the print stream job and its associated routines are concluded.

While certain embodiments have been described above in terms of the system within which the InStream server may reside, the invention is not limited to such a context. The systems shown in FIGS. 1A, 1B and 2 are an example of a host system for the invention, and the system elements are intended merely to exemplify the type of peripherals and software components that can be used with the invention.

In the foregoing specification, the invention has been described with 20 reference to specific embodiments thereof. It will, however, be evident that various modifications and changes may be made thereto without departing from the broader spirit and scope of the invention. For instance, the sequence of steps shown in FIG. 3 can be altered while still producing an effective and valid method sequence. The specification and drawings are, accordingly, to be regarded in an illustrative rather than a restrictive sense.

What is claimed is:

1. A method of establishing a job ticket representative of a print stream job to be performed by a client server, the method comprising the steps of:

(a) receiving a unique job message identifier from a server client;

(b) locating a job ticket template database representative of a set of unique job message identifiers;

(c) matching said received unique job message identifier with a job ticket template located in said job ticket template database, wherein said matching step further comprises;

(i) plotting each element of said unique message identifier to identify a set of elements to be mapped against a corresponding job ticket template;

(ii) selecting a database comprising a set of one or more job ticket templates;

(iii) mapping said unique message identifier against each one of said one or more job ticket templates;

(iv) determining whether or not a first match exists between said unique message identifier and any one of said one or more job ticket templates; and, if a first match exists then selecting said determined matched template to establish a new job ticket; and, if no first match exists, then determining the next closest match between said unique message identifier and said any one of said one or more job ticket templates to establish a second match; and (d) determining whether or not a match exists between said received unique job message identifier and said job ticket template; and, if said match exists then creating a job ticket instance; and, if said match does not exist then creating a new job ticket template; and endowing said new job ticket template with a set of print job parameters representative of said print stream job.

2. The method of claim 1, wherein said unique job message identifier is representative of a particular print processing job.

3. The method of claim 1, wherein said particular print processing job comprises a printer selection routine.

4. The method of claim 1, wherein said particular print processing job comprises an inserter instruction set.

5. The method of claim 1, wherein said particular print processing job comprises a communication instruction set.

6. The method of claim 1, wherein said job ticket template is created by a system operator to form a model for subsequent job tickets created during said ticket matching step and wherein said template is copied during said ticket matching step to create a new job ticket instance.

7. The method of claim 1, wherein said match determination is based upon a set of one or more matching rules.

8. The method of claim 7, wherein said set of one or more matching rules comprises an exclusion wherein said message identifier is identified as being excluded from being matched against said one or more templates.

9. The method of claim 1, wherein said system event initiates the creation of a new set of job parameters.

10. The method of claim 9, wherein said created set of job parameters establishes a job ticket representative of said parameters.

11. The method of claim 10, wherein said job ticket establishes a job ticket template which is stored in said database of said client server.

* * * * *